United States Patent
Chen et al.

(10) Patent No.: US 7,542,279 B2
(45) Date of Patent: Jun. 2, 2009

(54) MOUNTING APPARATUS FOR DATA STORAGE DEVICES

(75) Inventors: Yun-Lung Chen, Shenzhen (CN); Quan-Guang Du, Shenzhen (CN); Dong Qin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 298 days.

(21) Appl. No.: 11/308,817

(22) Filed: May 11, 2006

(65) Prior Publication Data

US 2007/0171699 A1 Jul. 26, 2007

(30) Foreign Application Priority Data

Dec. 30, 2005 (CN) .................... 2005 2 0121446

(51) Int. Cl.
*G06F 1/16* (2006.01)
(52) U.S. Cl. .................... 361/685; 361/724; 312/223.1; 312/223.2
(58) Field of Classification Search ......... 361/724–727; 312/223.1, 223.2, 333
See application file for complete search history.

(56) References Cited

U.S. PATENT DOCUMENTS

| | | | | |
|---|---|---|---|---|
| 4,688,131 A * | 8/1987 | Noda et al. | ................. | 360/137 |
| 6,227,516 B1 * | 5/2001 | Webster et al. | .............. | 248/694 |
| 6,337,793 B1 * | 1/2002 | Vier et al. | .................... | 361/683 |
| 6,646,872 B1 * | 11/2003 | Chen | .......................... | 361/685 |
| 6,728,109 B1 | 4/2004 | Wu | | |
| 6,853,549 B2 | 2/2005 | Xu | | |
| 7,142,431 B2 * | 11/2006 | Li et al. | ....................... | 361/726 |
| 7,237,854 B2 * | 7/2007 | Chen | ....................... | 312/223.2 |
| 2002/0101710 A1 * | 8/2002 | Diaz | .......................... | 361/685 |
| 2002/0140327 A1 * | 10/2002 | Kim | .......................... | 312/311 |
| 2005/0280982 A1 * | 12/2005 | Yang | .......................... | 361/684 |
| 2006/0044750 A1 * | 3/2006 | Chen | .......................... | 361/685 |
| 2006/0209508 A1 * | 9/2006 | Han et al. | ................... | 361/685 |
| 2007/0001560 A1 * | 1/2007 | Chen et al. | ............... | 312/223.2 |

* cited by examiner

*Primary Examiner*—Jayprakash N Gandhi
*Assistant Examiner*—Anthony Q Edwards
(74) *Attorney, Agent, or Firm*—Wei Te Chung

(57) ABSTRACT

A mounting apparatus is provided for a data storage device defining a mounting hole. The mounting apparatus includes a bracket for accommodating the data storage device and a locking latch. The bracket includes a side plate forming a cantilever thereon. A receiving portion is formed at a free end of the cantilever. The locking latch is pivotally attached to the side plate. The locking latch has an initial position parallel to the side plate. A projecting portion extends from the locking member, and is received by the receiving portion of the cantilever. A securing member is formed on the locking latch. When the locking latch is pivoted away from the side plate, the cantilever is distorted to store a potential elastic energy for urging the locking latch to move back to the initial position, thereby the securing member engaging into the mounting hole of the data storage device.

13 Claims, 6 Drawing Sheets

MOUNTING APPARATUS FOR DATA STORAGE DEVICES

FIELD OF THE INVENTION

The present invention relates to mounting apparatuses, and more particularly to a mounting apparatus for a data storage device of a computer system.

DESCRIPTION OF RELATED ART

A typical personal computer comprises data storage devices such as a hard disk drive (HDD), a floppy disk drive, and a compact disc-read only memory (CD-ROM) drive. Conventionally, the data storage devices are attached to a chassis of a computer enclosure using screws. A tool such as a screwdriver is required to fasten the screws, and to unfasten the screws when removing the data storage devices. The operations are laborious and time-consuming. Furthermore, even careful operators may cause the tool to slip, or may drop screws. When this happens, other internal components of the computer are liable to be damaged.

Nowadays, to allow convenient installation of a data storage device of a computer system, a pair of rails is typically provided. The rails are assembled to a pair of sidewalls of the data storage device, and then together inserted into a bracket of the computer system, between a pair of side plates of the bracket. However, the rails will increase space respectively between the sidewalls of the data storage device and the side plates of the bracket, thereby reducing EMI-proof (Electro Magnetic Interference, EMI) capability of the computer system.

What is needed, therefore, is a mounting apparatus with a simple structure for convenient installation and removal of a data storage device of a computer system.

SUMMARY OF INVENTION

A mounting apparatus is provided for a data storage device defining a mounting hole. The mounting apparatus includes a bracket for accommodating the data storage device and a locking latch. The bracket includes a side plate forming a cantilever thereon. A receiving portion is formed at a free end of the cantilever. The locking latch is pivotally attached to the side plate. The locking latch has an initial position parallel to the side plate. A projecting portion extends from the locking member, and is received by the receiving portion of the cantilever. A securing member is formed on the locking latch. When the locking latch is pivoted away from the side plate, the cantilever is distorted to store a potential elastic energy for urging the locking latch to move back to the initial position, thereby the securing member engaging into the mounting hole of the data storage device.

Other advantages and novel features will be drawn from the following detailed description of preferred embodiments with attached drawings, in which:

DETAILED DESCRIPTION

Figure 1:
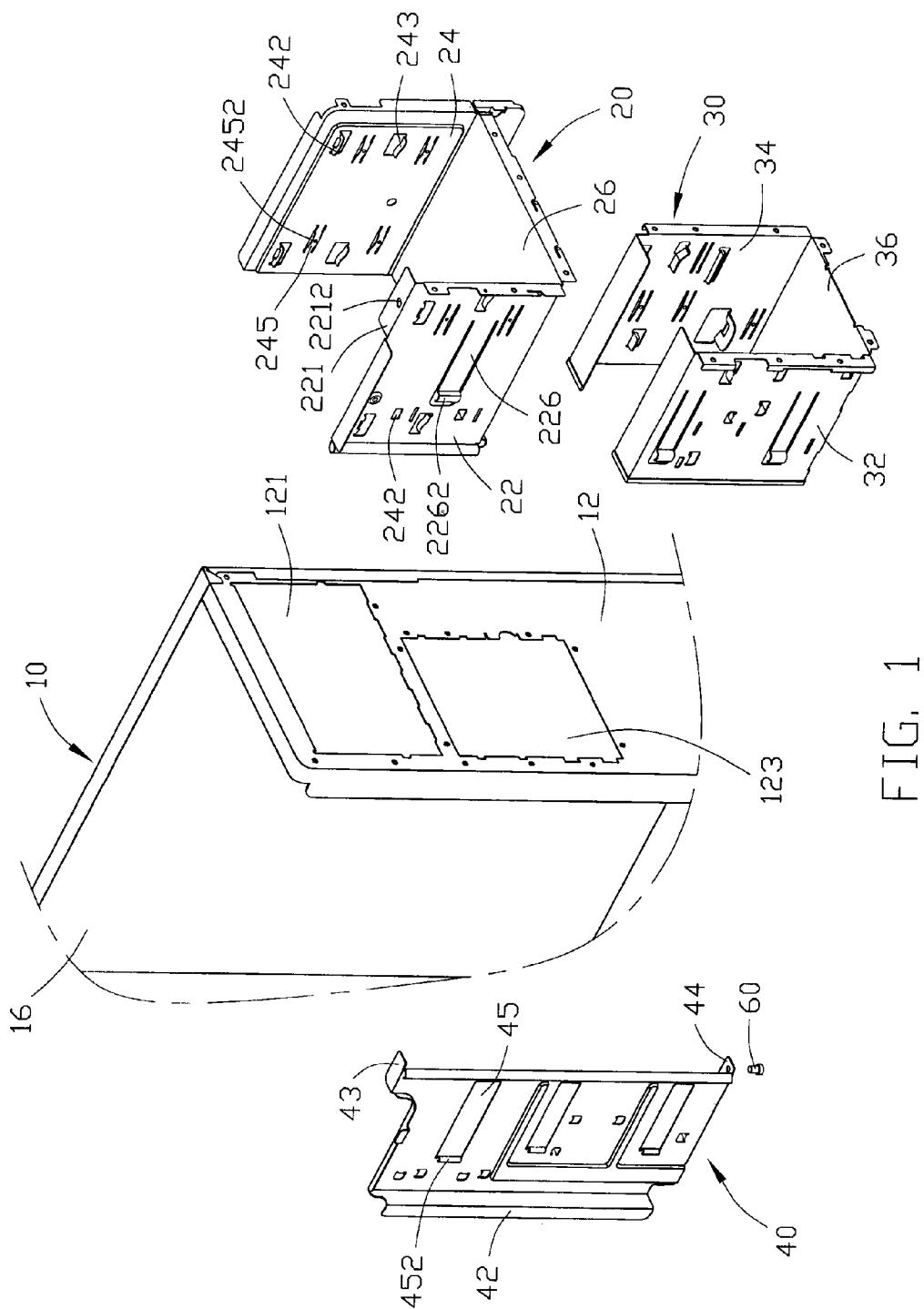
FIG. 1 is an exploded, isometric view of a mounting apparatus of a preferred embodiment of the present invention, the mounting apparatus including a first bracket and a second bracket attached to a computer enclosure, and a securing latch.
Figure 2:
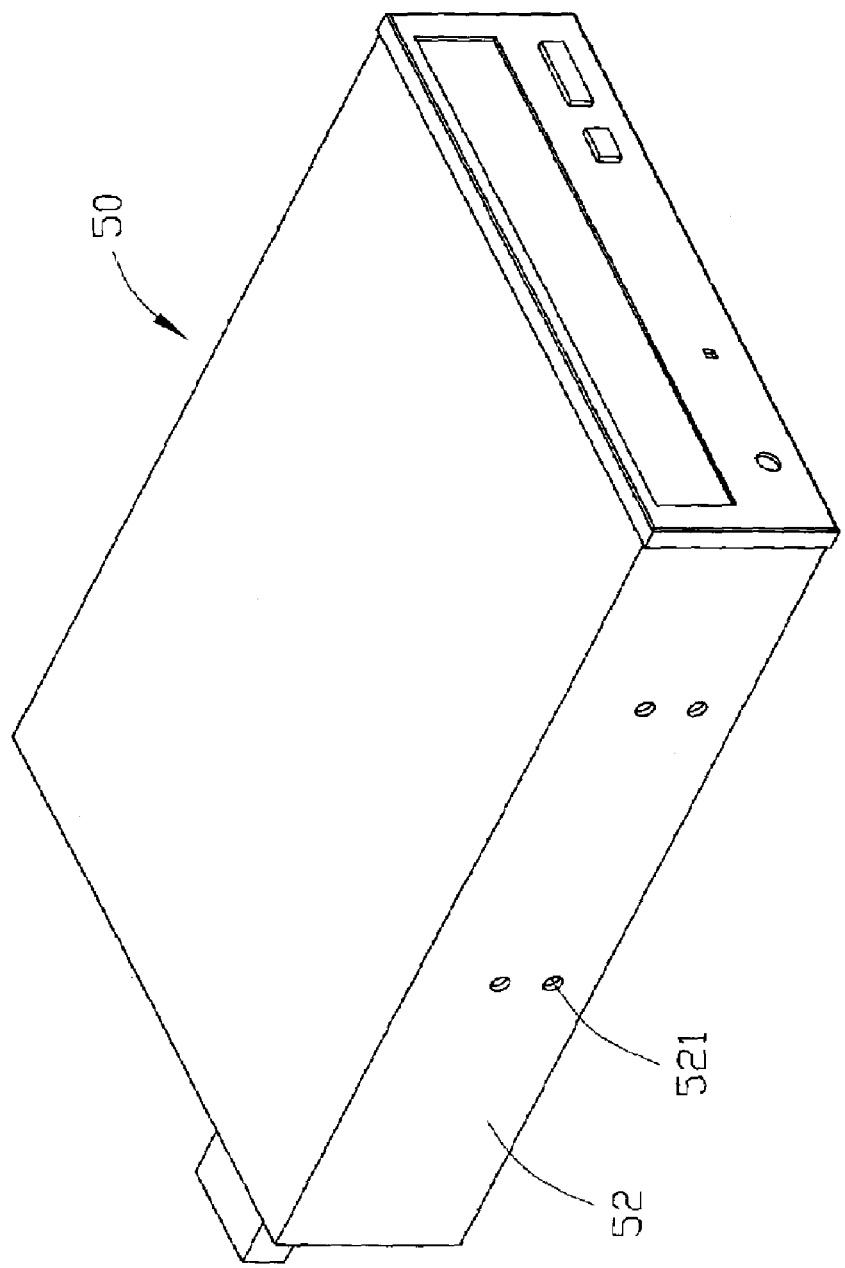
FIG. 2 is an isometric view of a data storage device.

Referring to FIGS. 1 and 2, a mounting apparatus of a preferred embodiment of the present invention is configured for securing storage devices 50. Each data storage device 50 has a pair of sidewalls 52. Two pairs of mounting holes 521 are defined in each sidewall 52. In this preferred embodiment, the mounting apparatus includes a first receiving bracket 20 and a second receiving bracket 30 attached to a computer enclosure 10 for receiving the data storage devices 50, and a locking latch 40 for positioning the data storage devices 50 in the brackets 20 and 30.

The computer enclosure 10 includes a front panel 12 and a side panel 16 perpendicular to the front panel 12. A first opening 121 and a second opening 123 are defined in the front panel 12 for insertion of the first receiving bracket 20 and second receiving bracket 30. The brackets 20 and 30 are secured to the front panel 12 and the side panel 16 of the computer enclosure 10, with rivets, screws, or other mounting means.

Figure 3:
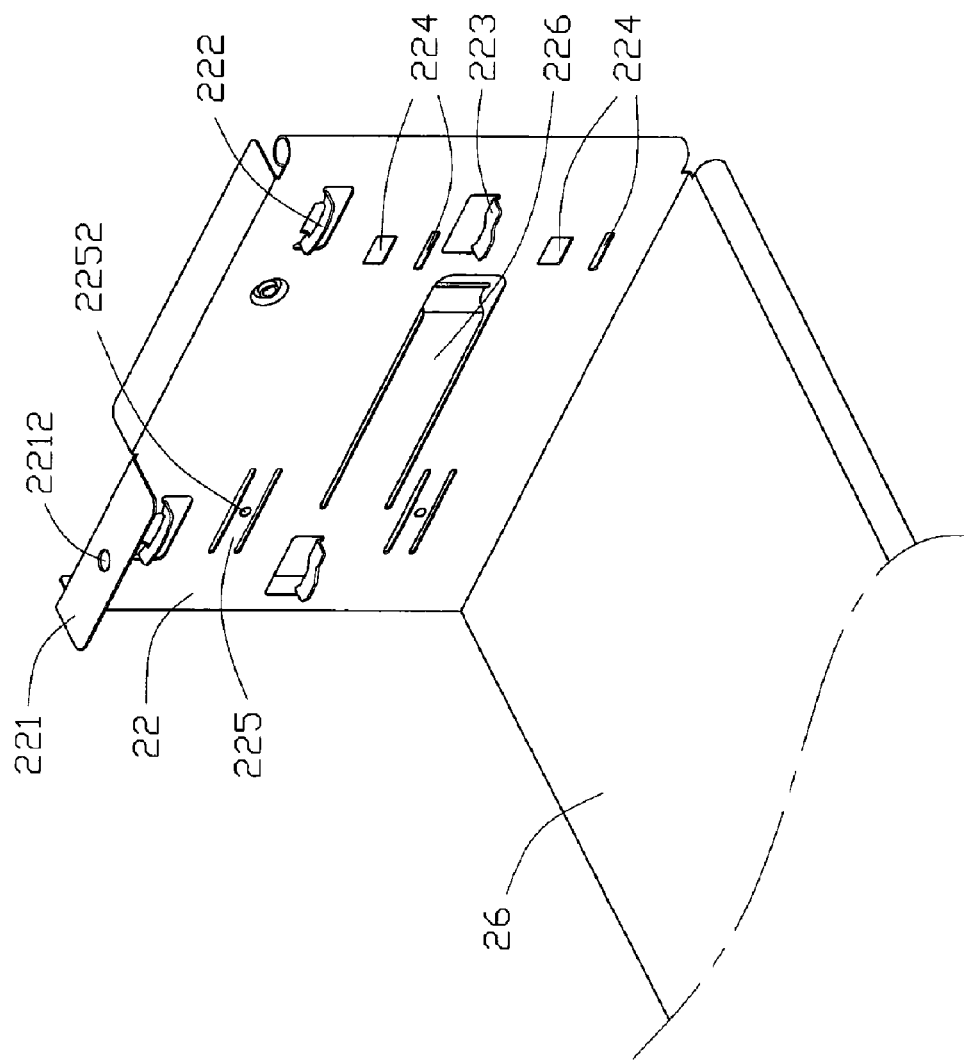
FIG. 3 is a partially enlarged, isometric view of the first bracket of FIG. 1, but shown from another aspect.

Referring also to FIG. 3, the first receiving bracket 20 includes a bottom plate 26, and a pair of side plates 22, 24 generally perpendicular to the bottom plate 26. A pair of supporting tabs 223, 243 parallel to each other is stamped in from a middle portion of the side plate 22 and 24, for supporting a data storage device 50. A pair of blocking tabs 222, 242 is respectively stamped in from the side plate 22, 24 over the supporting tabs 223, 243, for abutting on an upper face of the data storage device to limit a vertical movement. A pair of openings 224 corresponding to a pair of mounting holes 521 of the data storage device 50 is defined in the side plate 22 between one of the supporting tabs 223 and one of the blocking tabs 222. Another pair of openings 224 corresponding to a pair of mounting holes 521 of another data storage device 50 is defined in the side plate 22 under the supporting tab 223. Elastic securing members 225 with securing posts 2252 protruding therefrom are formed on the side plate 22, one between another supporting tab 223 and another blocking tab 222, and the other formed under the supporting tab 223. A plurality of elastic securing members 245 each also having a securing post 2252 protruding therefrom is formed on the side plate 24. The securing posts 2252 of the elastic securing members 245, 225 are for engaging in the mounting holes 521 of the side walls 52 of the data storage device 50. An elastic cantilever 226 is formed on the side plate 22 between the supporting tabs 223. A receiving portion 2262 is formed at a free end of the cantilever 226. A flange 221 defining a pivot hole 2212 extends in from a top edge of the side plate 22.

Figure 4:
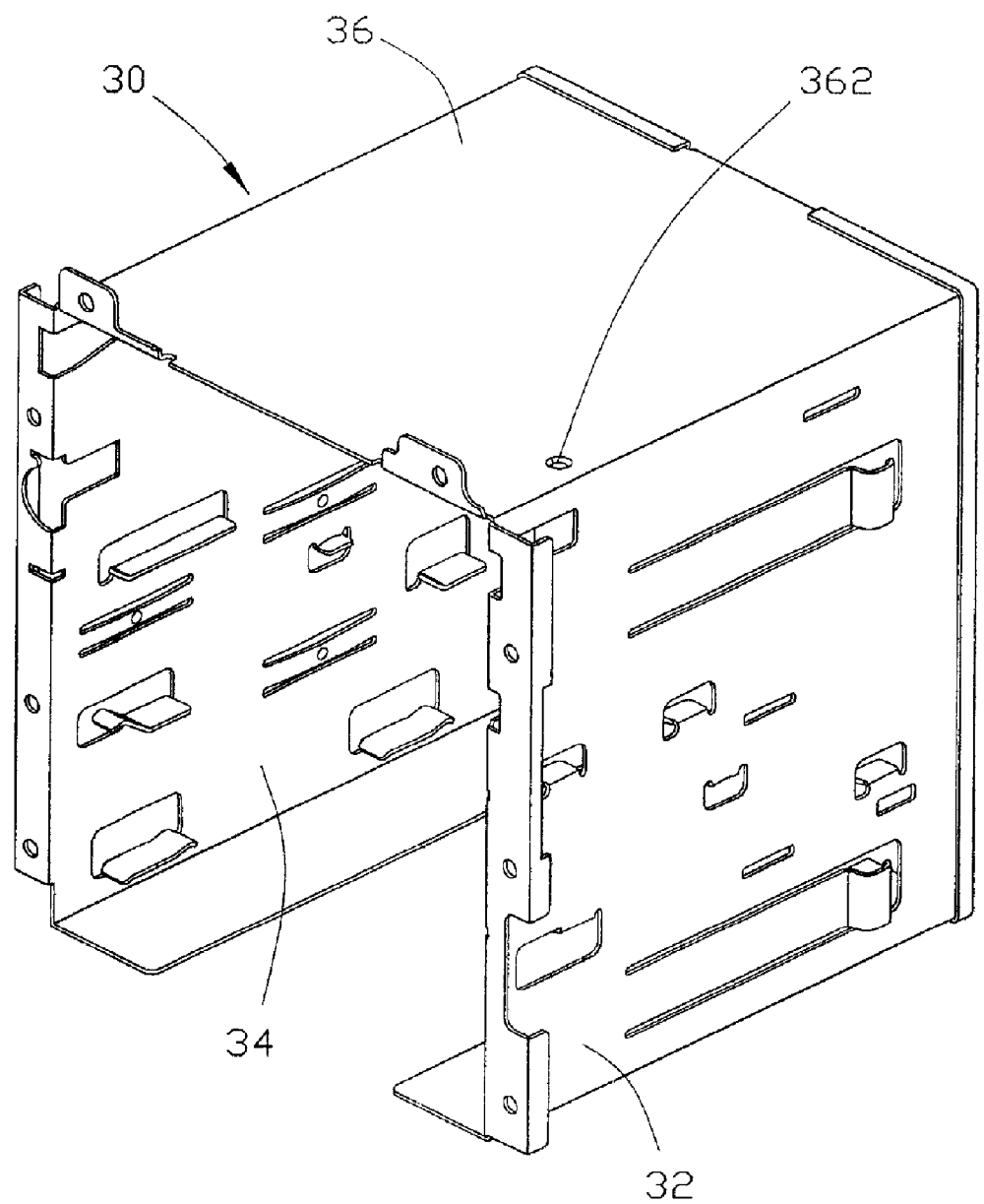
FIG. 4 is an isometric view of the first bracket of FIG. 1, but shown from another aspect.

The second receiving bracket 30 includes a bottom plate 36, and a pair of side plates 32, 34 generally perpendicular to the bottom plate 36. The configuration of the side plates 32, 34 are generally the same as the side plates 22, 24 of the first receiving bracket 20. Referring to FIG. 4, a pivot hole 362 is defined in the bottom plate 36 of the second receiving bracket 30.

Figure 5:
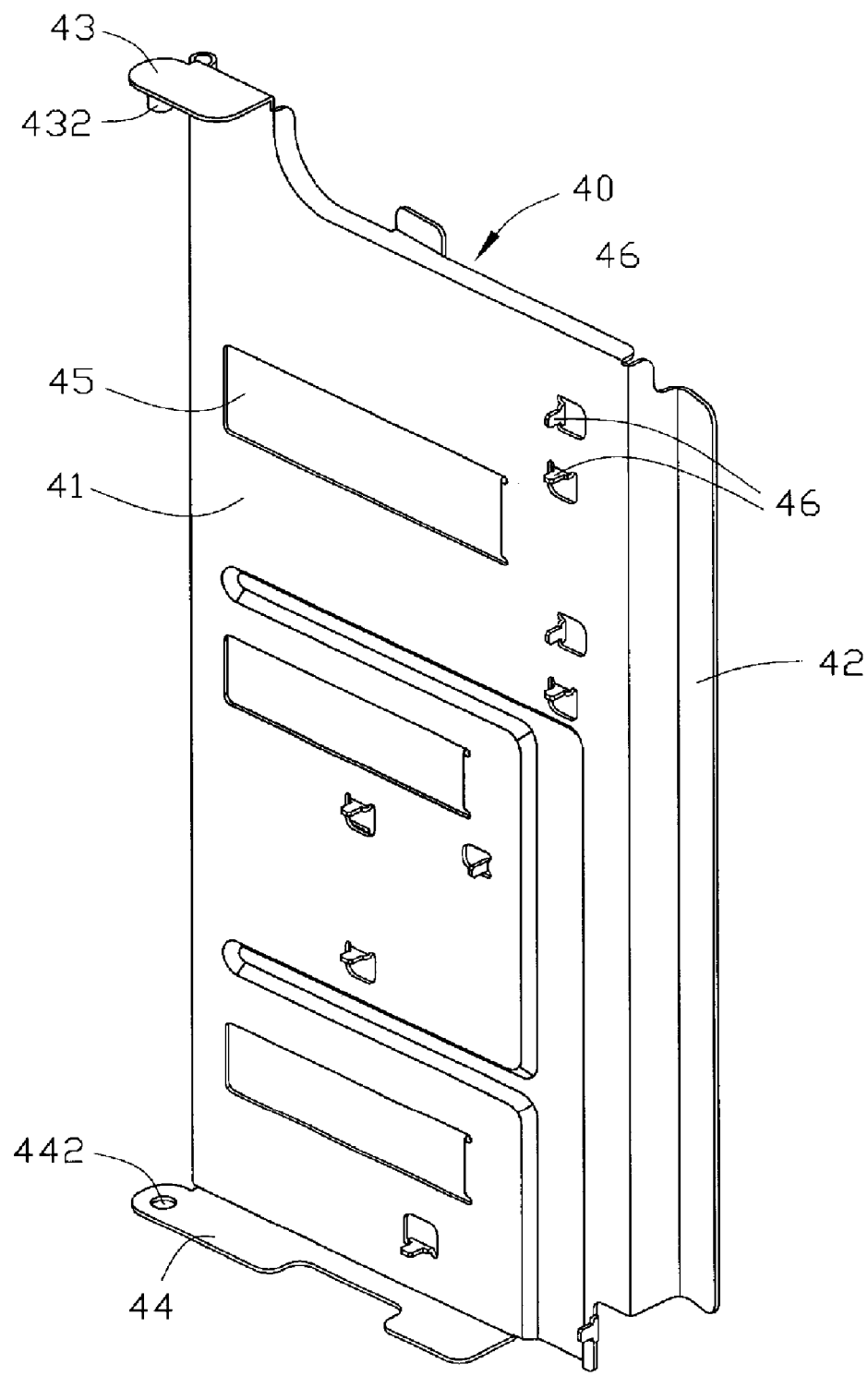
FIG. 5 is an isometric view of the locking latch of FIG. 1, but shown from another aspect.

Referring to FIG. 5, the locking latch 40 includes a rectangular base plate 41. A first flange 43 extends laterally from a top edge of the base plate 41. A post 432 protrudes down from a bottom face of the flange 43 corresponding to the pivot hole 2212 of the first receiving bracket 20. A second flange 44 extends laterally from a bottom edge of the base plate 41. A pivot hole 442 is defined in the second flange 44 corresponding to the pivot hole 362 of the second receiving bracket 30. An L-shaped handle 42 extends from one side edge of the base plate 41 for operating the locking latch 40. Pairs of securing members 46 are stamped in from the base plate 41 corresponding to the mounting holes 521 of the data storage device 50. Wherein each pair of securing members 46 includes a horizontal tab and a vertical tab respectively inserted in the mounting holes 521 of the data storage devices 50. A plurality of openings 45 is defined in the base plate 41 corresponding to the cantilever 226 of the first receiving bracket 20 and the second receiving bracket 30. A projecting portion 452, such as a coil shaped portion, extends out from a side edge of each opening 45 corresponding to the receiving portions 2262 of the receiving brackets 20 and 30.

Figure 6:
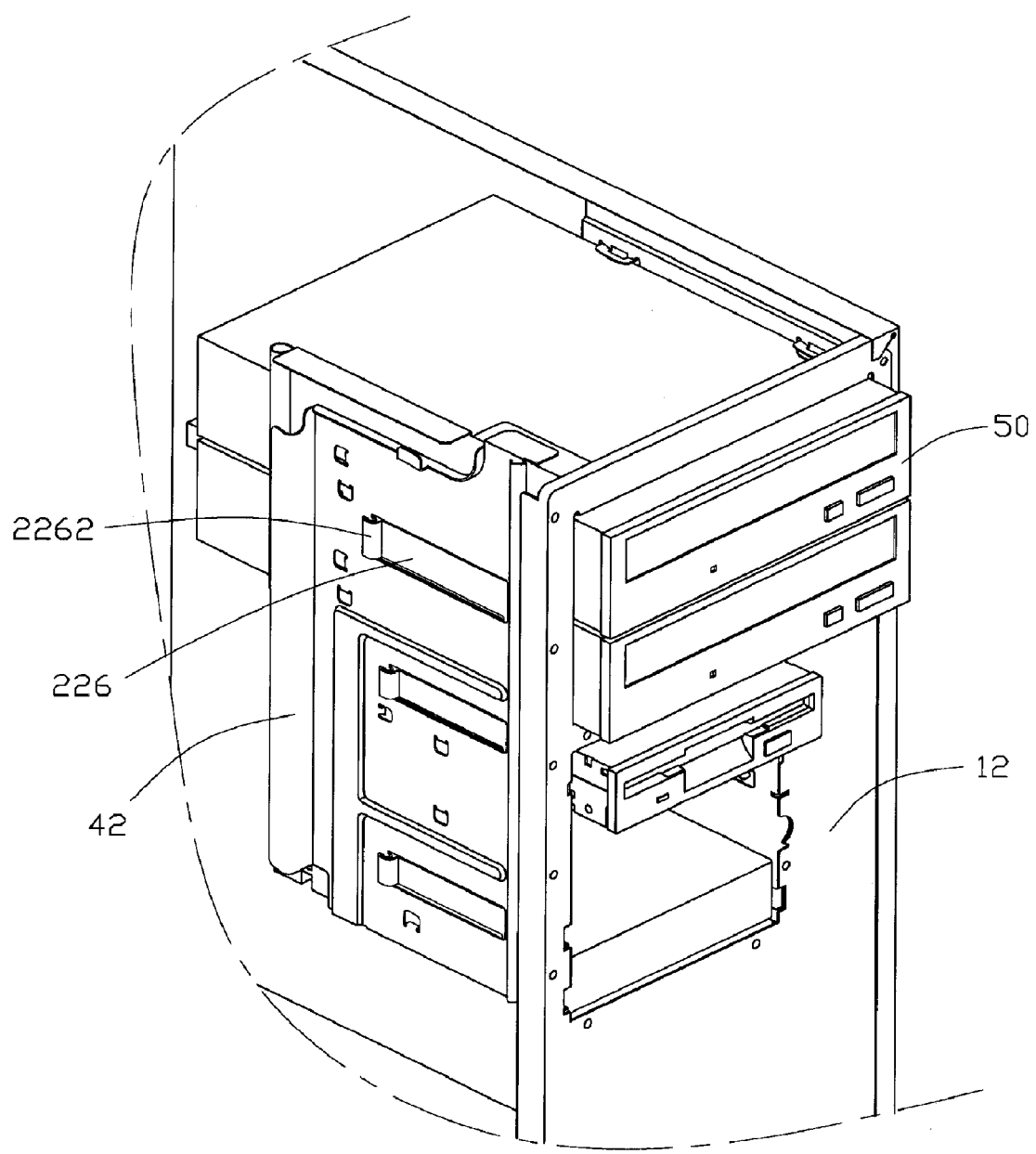
FIG. 6 is an assembled view of the mounting apparatus and data storage devices.

Referring also to FIG. 6, the locking latch 40 is pulled forward along the side plate 22 of the first receiving bracket 20, until the projecting portion 452 of the locking latch 40 is enclosed in the receiving portions 2262 of the receiving brackets 20 and 30. The post 432 of the locking latch 40 is inserted into the pivot hole 2212 of the first receiving bracket 20. The pivot hole 442 of the locking latch 40 is aligned with the pivot hole 362 of the second receiving bracket. A fastener 60 passes through the pivot holes 442, 362, for pivotally attaching the locking latch 40 to the receiving brackets 20, 30. The pivot holes 442, 362 can all be defined in only one receiving bracket 20 or 30.

In assembly, pull the operation handle 42 laterally to pivot the locking latch 40. The receiving portion 2262 is forced to move outward, and the securing members 46 of the locking latch 40 move out of the openings 224 of the first receiving bracket 20. Then the data storage devices 50 are inserted in the first receiving bracket 20 and the second receiving bracket 30 respectively through the first opening 121 and the second opening 123 of the enclosure 10. The securing posts 2252, 2452 of the side plates 22, 24 are respectively engaged in the mounting holes 521 of the data storage devices 50. When the handle 42 is released, the projecting portion 452 is received by the receiving portion 2262, for urging the locking latch 40 to a position generally parallel to the side plate 22. The securing members 46 of the locking latch 40 pass through the openings 224 and insert in the corresponding mounting holes 521 of the data storage devices 50, thereby securing the data storage devices 50 to the receiving brackets.

In removing the data storage devices 50, pull the operating handle 42 laterally to pivot the locking latch 40. The securing members 46 of the locking latch 40 disengage from the mounting holes 521 of the data storage devices 50. Meanwhile, the projecting portion 452 of the locking latch 40 moves laterally to force the receiving portions 2262 to distort outward. Then, the data storage devices 50 are pulled out from the receiving brackets 20, 30. Releasing the operating handle 42, the first elastic projecting portions 2262 rebounds generally to an original position. The locking latch 40 pivots to an initial position parallel to the side plate 22 of the receiving bracket 20, for a next operation.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a data storage device, at least one mounting hole defined in the data storage device, the mounting apparatus comprising:
    a bracket for accommodating the data storage device, the bracket comprising a side plate forming a cantilever thereon, and a receiving portion formed at a free end of the cantilever; and
    a locking latch pivotally attached to the side plate of the bracket for securing the data storage device in the bracket, a projecting portion extending from the locking latch, and received by the receiving portion of the cantilever, at least one securing member formed on the locking latch, the locking latch having an initial position parallel to the side plate;
    wherein, the cantilever is deformed by the projecting portion of the locking latch when the locking latch is pivoted away from the side plate, thus creating a potential elastic energy that pushes the locking latch to move back to the initial position, thereby forcing the at least one securing member to engage into the at least one mounting hole of the data storage device.

2. The mounting apparatus for a data storage device as described in claim 1, wherein the projecting portion of the locking latch is a generally coil shaped portion.

3. The mounting apparatus for a data storage device as described in claim 1, wherein the locking latch is a rectangular piece having a top flange and a bottom flange, a pivot post protruding down from the top flange, a pivot hole defined in a top flange of the bracket for the pivot post passing through.

4. The mounting apparatus for a data storage device as described in claim 3, wherein a pivot hole is defined in the bottom flange of the locking latch, and a corresponding pivot hole is defined in a bottom plate of the bracket, a fastener protruding through the pivot holes pivotally attaching the locking latch to the bracket.

5. The mounting apparatus for a data storage device as described in claim 1, wherein the locking latch comprises an operating handle extending from a side edge thereof.

6. The mounting apparatus for a data storage device as described in claim 1, wherein the securing member comprises a pair of tabs, and one is horizontal, the other is vertical.

7. The mounting apparatus for a data storage device as described in claim 1, wherein at least a through opening is formed in the side plate of the bracket, for the at least one securing member extending through.

8. A mounting assembly, comprising:
    a data storage device defining at least one pair of mounting holes;
    a bracket for accommodating the data storage device, the bracket comprising a side plate forming an elastic clip; and
    a locking member pivotally attached to the side plate of the bracket for securing the data storage device in the bracket, the locking member comprising a projecting portion restrained by the elastic clip of the bracket, at least one horizontal securing tab and at least one vertical securing tab extending in from the locking latch for engaging into the at least one pair of mounting holes of the data storage device;
    wherein the elastic clip is distorted by the projecting portion of the locking latch when the locking latch is pivoted away from the side plate to store a potential elastic energy capable of urging the locking latch back to abut on the side plate of the bracket.

9. The mounting assembly as described in claim 8, wherein the elastic clip of the bracket is a cantilever having a receiving portion formed at a free end thereof.

10. The mounting assembly as described in claim 9, wherein the projecting portion of the locking latch is a coil shaped portion received by the receiving portion of the elastic clip.

11. The mounting assembly as described in claim 8, wherein the locking latch is a rectangular piece having a top flange and a bottom flange, a pivot post protruding down from the top flange, a pivot hole defined in a top flange of the bracket for the pivot post passing through.

12. The mounting assembly as described in claim 11, wherein a pivot hole is defined in a bottom flange of the locking latch, and a corresponding pivot hole is defined in a bottom plate of the bracket, a fastener protruding through the pivot holes pivotally attaches the locking latch to the bracket.

13. The mounting assembly as described in claim 8, wherein the locking latch comprises an operating handle extending from a side edge thereof.

* * * * *